(12) United States Patent
Bagley et al.

(10) Patent No.: US 8,170,970 B2
(45) Date of Patent: May 1, 2012

(54) CONSTRAINT BASED SYSTEM THAT IDENTIFIES TOP CONSTRAINT EXPRESSIONS

(75) Inventors: Claire M. Bagley, Carlisle, MA (US); Joyce Ng, Sunnyvale, CA (US); Michael Colena, Lowell, MA (US); Gao Chen, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 570 days.

(21) Appl. No.: 12/490,725

(22) Filed: Jun. 24, 2009

(65) Prior Publication Data
US 2010/0332435 A1 Dec. 30, 2010

(51) Int. Cl.
G06N 5/00 (2006.01)
(52) U.S. Cl. .......................... 706/46; 706/45
(58) Field of Classification Search ............ 706/46, 706/45
See application file for complete search history.

(56) References Cited

U.S. PATENT DOCUMENTS

| | | |
|---|---|---|
| 7,069,537 B2 | 6/2006 | Lazarov |
| 7,333,968 B2 | 2/2008 | Geller et al. |
| 7,409,377 B2 | 8/2008 | Emek et al. |
| 2002/0107749 A1 | 8/2002 | Leslie et al. |
| 2002/0143653 A1 | 10/2002 | DiLena et al. |
| 2002/0166089 A1 | 11/2002 | Noy |
| 2004/0019852 A1 | 1/2004 | Purvis |
| 2005/0198621 A1 | 9/2005 | Tillmann et al. |
| 2005/0278271 A1 | 12/2005 | Anthony et al. |
| 2007/0094184 A1 | 4/2007 | Emek et al. |
| 2008/0288482 A1 | 11/2008 | Chaudhuri et al. |

OTHER PUBLICATIONS

Helzerman, et al, MUSE CSP: An Extension to the Constraint Satisfaction Problem, Journal of Artificial Intelligence Research 5 (1996) pp. 239-288.* van der Linden, Assigning Satisfaction Values to Constraints: An Algorithm to Solve Dynamic Meta-Constraints, Faculty of Mathematics and Computing, The Open University, 2001, pp. 1-11.*

Fruhwirth, Thom et al; "Principles of Constraint Systems and Constraint Solvers"; Archives of Control Sciences: Special Issue on Constraint Programming; 16(2); http://www.informatik.uniulm.de/pm/mitarbeiter/fruehwirth/Papers/acssystems3.pdf; 2006.

Lhomme, Olivier; "Consistency Techniques for Numeric CSPS"; Proceedings in IJCAI-93; pp. 232-238; 1993; Chambery, France.

Selectica; "Selectica Configuration"; Solution Overview; 2005; Selectica, Inc.; San Jose, CA.

ILOG; "ILOG Configurator, Powering online product and service configuration applications"; Product Datasheet; Mar. 2005; ILOG.S.A.

(Continued)

*Primary Examiner* — Wilbert L Starks
(74) *Attorney, Agent, or Firm* — Squire Sanders (US) LLP

(57) ABSTRACT

A constraint solver solves a constraint satisfaction problem ("CSP") that includes a network of variables and constraints. The solver receives a sub-expression and determines if the sub-expression is an internal constraint of the CSP. The internal constraint has a supporting operator expression. If the sub-expression is an internal constraint, the solver determines any or all top constraint expressions associated with the supporting operator expression.

13 Claims, 7 Drawing Sheets

OTHER PUBLICATIONS

Oracle; "Oracle Configurator"; Oracle Data Sheet; 2008; Oracle.

Tacton; "Tacton's Sales Configurator—Bridging the gap between engineering and sales for selling customized products"; http://www.tacton.com/tem plates/page_68.aspx?epslanguage=EN; 2007; Tacton Systems AB; Sweden.

Benhamou, Frederick et al.; "Applying Interval Arithmetic to Real, Integer and Boolean Constraints"; Journal of Logic Programming. 32(1); 1997.

Sabin, Daniel et al.; "Configuration as Composite Constraint Satisfaction"; Proceedings of the (1st) Artificial Intelligence and Manufacturing Research Planning Workshop; 1996.

Junker, Ulrich et al.; "Preference programming: Advanced problem solving for configuration"; pp. 13-29; 2002.

Narendra Jussien et al.; "Dynamic domain splitting for numeric CSPS"; pp. 225-227; 1998.

Fleischanderl, Gerhard et al.; "Configuring Large Systems Using Generative Constraint Satisfaction"; IEEE; pp. 59-68; No. 1094-7167/98; Jul./Aug. 2008.

Mittal, Sanjay et al.; "Dynamic Constraint Satisfaction Problems"; Proceedings of the Eighth National Conference on Artificial Intelligence; 1996.

Stumptner, Markus et al.; "Generative Constraint-Based Configuration of Large Technical Systems"; Artificial Intelligence for Engineering Design, analysis and Manufacturing; pp. 307-320; No. 12; 1998; Cambridge University Press, USA.

Gelle, Esther et al.; "Solving Methods for Conditional Constraint Satisfaction"; IJCAL; 2003.

Junker, Ulrich;"QuickXplain: Conflict Detection for Arbitrary Constraint Propagation Algorithms"; ILOG; Valbonne, France; 2001.

* cited by examiner

CONSTRAINT BASED SYSTEM THAT IDENTIFIES TOP CONSTRAINT EXPRESSIONS

FIELD OF THE INVENTION

One embodiment is directed generally to a computer system, and in particular to a constraint based computer system that solves constraint satisfaction problems.

BACKGROUND INFORMATION

Many of the tasks that are addressed by decision-making systems and artificial intelligence systems can be represented as constraint satisfaction problems ("CSP"s). In this representation, the task is specified in terms of a set of variables, each of which can assume values in a given domain, and a set of constraints that the variables must simultaneously satisfy. The set of variables, domains and constraints is referred to as a CSP. Each constraint may be expressed as a relation, defined over some subset of the variables, denoting valid combinations of their values. A solution to a CSP is an assignment of a value to all the variables from their respective domains that satisfies all of the constraints.

A constraint based system includes a constraint solver that attempts to find one or more solutions to a given CSP, or prove that no solution exists. Constraint based systems are used for many artificial intelligence related applications and a variety of other applications, including: (1) Product configurators; (2) Robotic control; (3) Temporal reasoning; (4) Natural language processing; (5) Spatial reasoning; (6) Test-case generation for software and hardware systems; (7) Machine vision; (8) Medical diagnosis; (9) Resource allocation; and (10) Frequency allocation.

The network of constraints in a CSP can be viewed as a graph, having a node for each variable and an edge or an "arc" for each constraint. The members of each arc are the variables that appear in the constraint to which the arc corresponds. An arc is said to be consistent if for any variable of the arc, and any value in the domain of the variable, there is a valid assignment of values to the other variables on the arc that satisfies the constraint represented by the arc.

Classes of problems exist which are comprised of very large sets of variables that may only be conditionally related or required for a solution. One example of such problems is the configuration of large component-based systems. For example, selecting a type of hard disk controller for a computer configuration is not needed if a hard disk has not been chosen as a form of storage. If instead flash memory is chosen, a different set of variables and constraints would be required to be solved. Known CSP solvers do not allow the representation of conditional structure or reasoning over an inclusion of a variable in a solution. Techniques have been developed to allow such large problems to be represented as a set of smaller sub-problems, conditionally related through composition or association. A "dynamic constraint satisfaction problem" is one in which these sub-problems of variables and constraints can be incrementally added as required, either explicitly or as a result of inference from the propagation of constraints.

One known approach to minimize large CSP problems is referred to as "Conditional CSP", and includes the notion of a variable being active or inactive, as well as constraints to activate a variable. In this approach, a variable is only assigned a value in the final solution if it is active. Conditional CSP is limited in that it does not provide any significant space savings in large problems, nor does it allow for segmentation of related variables into sub-problems. Another known approach is referred to as "Generative CSP" and extends Conditional CSP by introducing the concept of components, which are groups of related variables, and component type, which is the further extension and specialization of these components. However, similar to Conditional CSP, Generative CSP is still implemented in terms of activity state and does not provide real space savings.

SUMMARY OF THE INVENTION

One embodiment is a constraint solver that solves a constraint satisfaction problem ("CSP"). The CSP includes a network of variables and constraints. The solver receives a sub-expression and determines if the sub-expression is an internal constraint of the CSP. The internal constraint has a supporting operator expression. If the sub-expression is an internal constraint, the solver determines any or all top constraint expressions associated with the supporting operator expression.

DETAILED DESCRIPTION

One embodiment is a constraint based system that identifies top constraint expressions for a given sub-expression. If the sub-expression generates a conflict, the system can use the identified top constraint expressions to, for example, perform graph analysis or provide meaningful information to a user in resolving the conflict.

Figure 1:
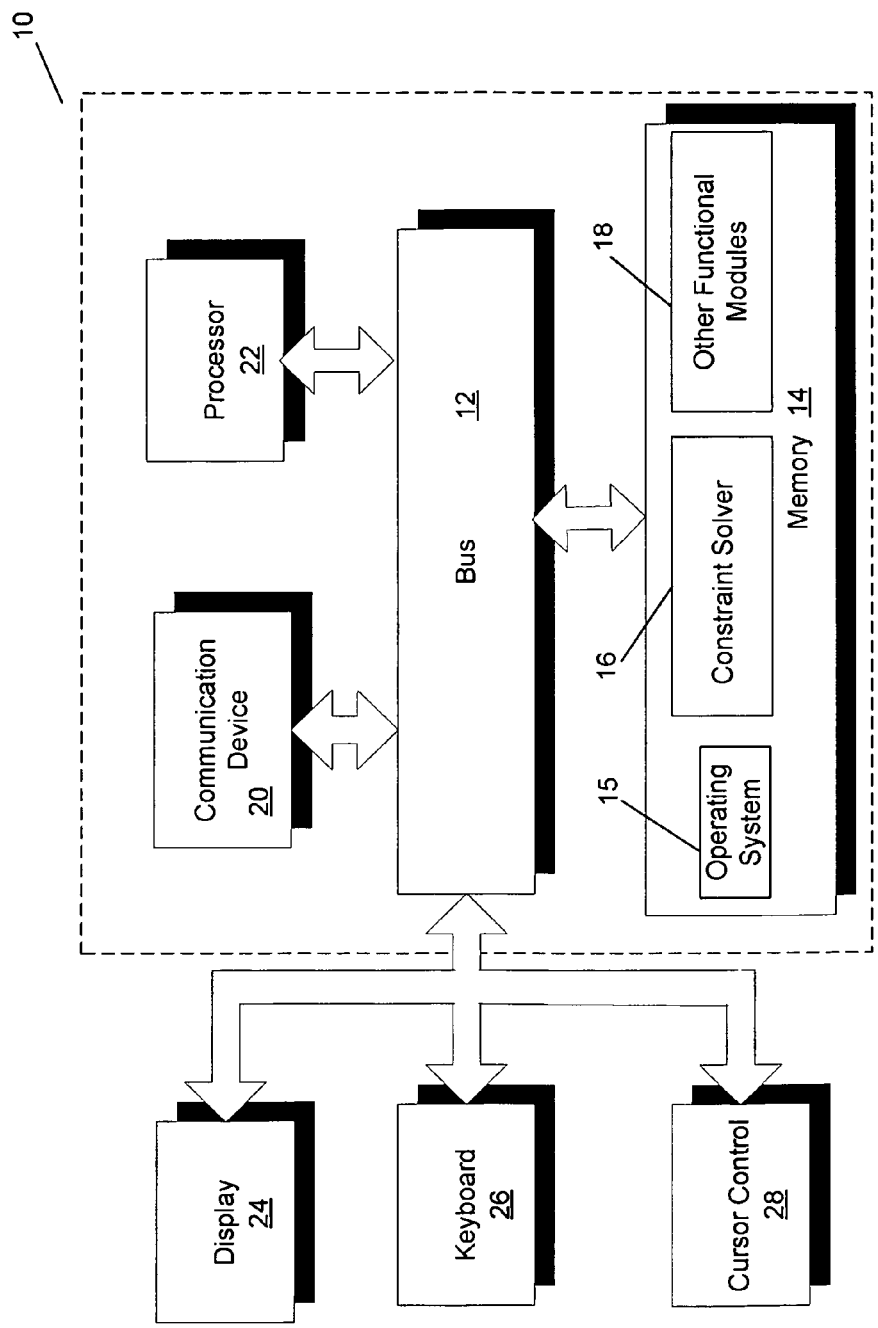
FIG. 1 is a block diagram of a constraint based system that can implement an embodiment of the present invention.

FIG. 1 is a block diagram of a constraint based system 10 that can implement an embodiment of the present invention. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a constraint solver module 16 that performs constraint solving with the identification of top constraint expressions as disclosed in more detail below. System 10 can be part of a larger system that includes a constraint solver such as a product configurator or artificial intelligence system. Therefore, system 10 will typically include one or more additional functional modules 18 to include the additional functionality.

In one embodiment, constraint solver 16 models problems as a network of a set of variables that each have a domain of possible values, and constraints that limit the value that the variables may take. Constraint solver 16 then solves the constraint problem. A solution to the problem is a state in which each variable has had its domain limited to a single value and no constraint has been violated. Constraint solver 16 acts to find one, or more, solutions to a given problem, or to prove that no solution exists.

Table 1 below provides examples of variables and domains, and Table 2 below provides examples of constraints.

TABLE 1

| Variable Name | Type | Domain |
| --- | --- | --- |
| A | Integer (enumerated) | {1, 2, 4, 5, 6} |
| B | Integer (interval) | [1 ... 5] |
| Weight | Float | [1.25 ... 10.50] |
| Choice | Boolean | {false, true} |
| Color | Set | {Black, Red, Silver, Blue} |

TABLE 2

| Constraints |
| --- |
| A = B |
| Weight = Sum (contents.weight) |
| Choice Requires (Not (Color contains Black)) |

Constraint programming is a discipline that deals with the representation of a problem in a manner that allows for solutions to be formulated. A constraint problem is modeled as a set of variables that each has a domain of possible values. The relations and limitations between the variables are expressed as constraints. The constraints act to limit the value that a variable may take.

A constraint satisfaction problem ("CSP") may consist of many constraint expressions. Each expression will include an "operator expression" (e.g., an arithmetic operator, a logical operator, etc.) and participants, which could be in the form of variable(s) and/or other expression(s). Participating constraint expressions are referred to as "sub-expressions". The top-most expression that does not participate in any other expression can be referred to as the "top constraint expression". In one embodiment, a top constraint expression must have a logical operator (e.g., =, !=, <, >, implies, excludes, etc.).

Figure 2:
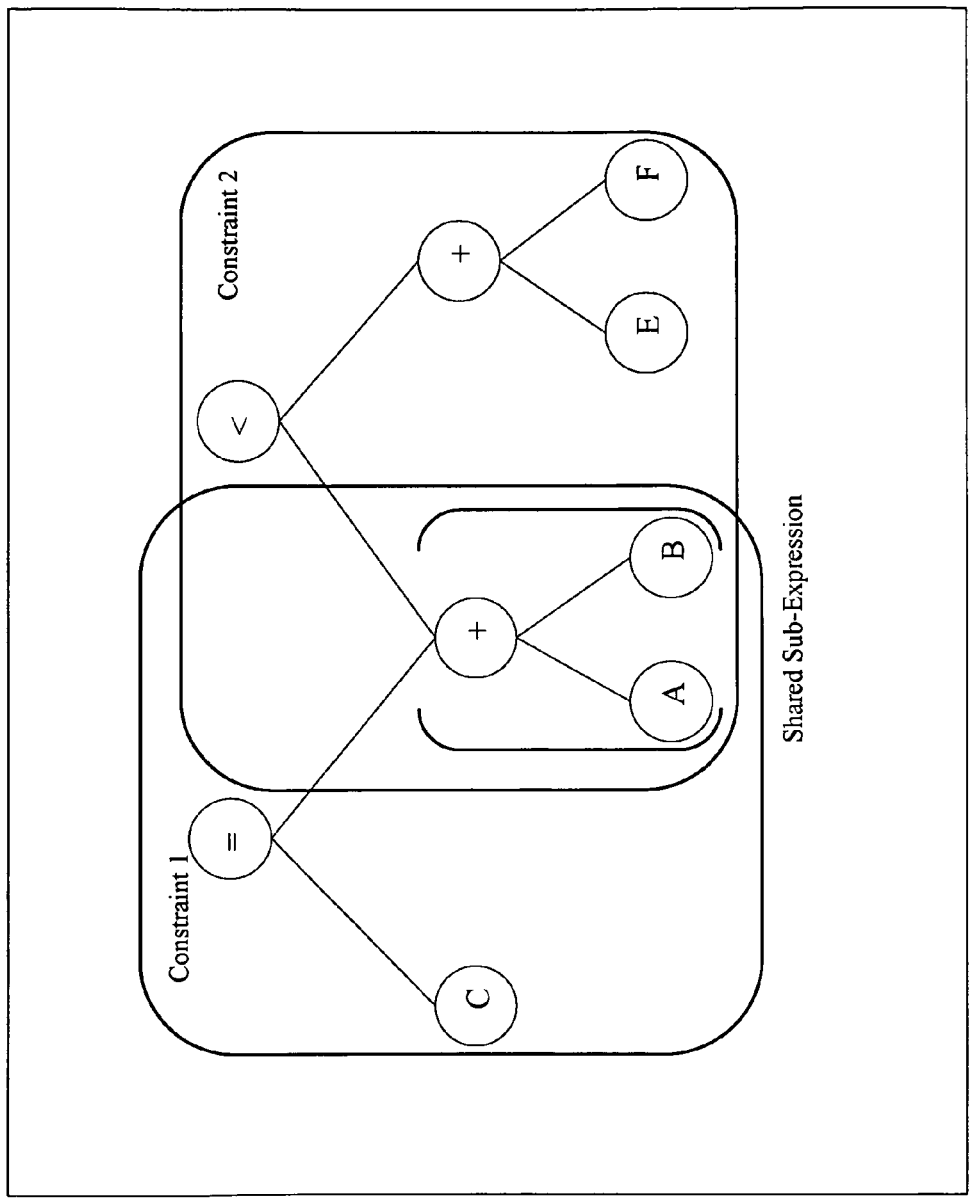
FIG. 2 is a block diagram that illustrates an example of a shared common sub-expression.

In constraint networks that may include many compound constraint expressions, one known technique used to minimize network size, and improve system performance, is to utilize shared common sub-expressions. FIG. 2 is a block diagram that illustrates an example of a shared common sub-expression. In the example of FIG. 2, a single occurrence of the common sub-expression A+B could be created and linked to both top constraint expressions 1 and 2.

For FIG. 2, the two top constraint expressions 1 and 2 may be defined as follows:

$$A+B=C \qquad \text{Constraint 1}$$

$$A+B<E+F \qquad \text{Constraint 2}$$

Integer variables defined: A, B, C, D, E, and F

In constraint 1, the two participants of the top constraint expression 1 (i.e., with operator) are the "+" sub-expression and variable C. The "+" sub-expression in turn has two participants: variable A and variable B. In top constraint expression 2, the two participants of the "<" operator are the two "+" sub-expressions, whose participants are variable A and B, and variable E and F, respectively.

In some instances, solver 16 may generate an "internal" constraint. An internal constraint may be a top constraint of one or more sub-expressions through an associated operator. An internal constraint may also be generated as an associated constraint in response to or as an implication to a specific external constraint, or to strengthen the pruning power of the other constraint. For example, an internal constraint can be generated in response to an external constraint "a/b" where a and b are two numeric variables. Based on the external constraint, an internal constraint, b≠0, may be generated since the division cannot be defined over a denominator that has the value 0 in its domain. In this example, the internal constraint is not a sub-expression of the external constraint. However, it is associated with the external constraint because its "existence" is triggered by the definition of the external constraint.

Figure 3:
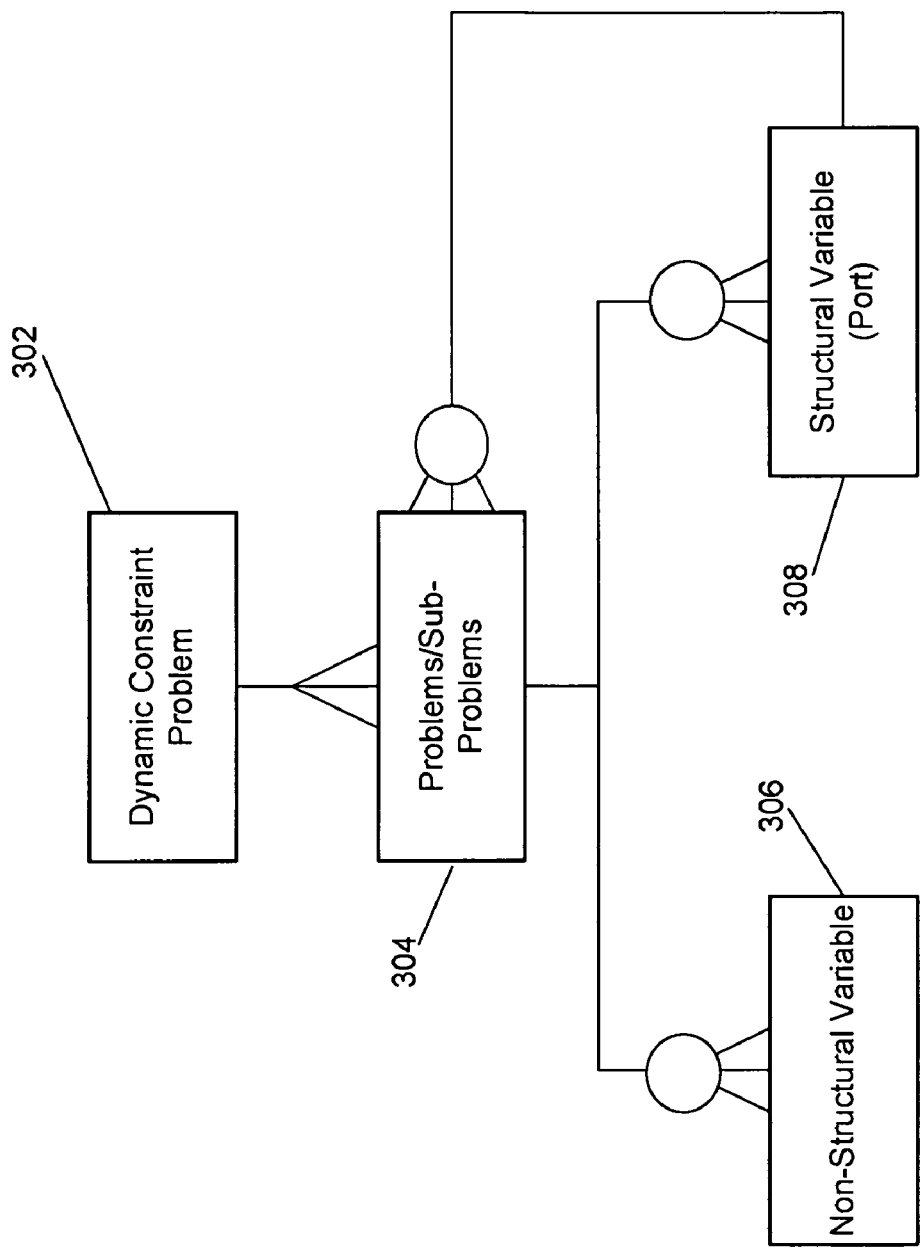
FIG. 3 illustrates the hierarchy of a model of a dynamic constraint problem in accordance with one embodiment.

FIG. 3 illustrates the hierarchy of a model of a dynamic constraint problem 302 in accordance with one embodiment. Dynamic constraint problem 302 includes one or more problems or sub-problems 304 (a "sub-problem" may also be a "problem", and vice versa depending on where it falls in the hierarchy). In an embodiment where the dynamic constraint problem is for a product configurator, the problems/sub-problems are the components/sub-components of the configurator.

Each problem 304 is formed of zero or more non-structural variables 306. Examples of non-structural variables 306 includes Boolean variables, integers, floating point variables, etc. Each problem 304 may also include zero or more structural variables or "ports" 308. A port is a container for problems and connects sub-problems to the problem or to another sub-problem or acts as an extension point from one problem to another problem. Each port 308 can be connected to zero or more sub-problems 304. A port may be defined by two items: (a) the definition of the problem to be connected to the port; and (b) a numeric domain representing how many instances of the problem is required or allowed in the port (referred to as the port's "cardinality").

In a dynamic constraint satisfaction problem, it is natural to have constraints across different problems, such as a constraint between a problem and a sub-problem of it, or a constraint among multiple sub-problems of the same parent problem. However, since the problems that are involved in these cross problem constraints may be generated dynamically, the existence of the cross problem constraints themselves actually depend on the existence of the involved problems.

In addition to the modeler defined constraint expressions as shown in FIG. 2, a CSP solver can also utilize internal constraint expressions to enhance the inference power of some operators. These internal constraints can be automatically generated by the solver when the operator that they enhance is added to the CSP.

One example of such a operator is a port operator. Assume that a port operator contains elements which are sub-problems, and these sub-problems are of multiple types with a common root type. An internal constraint can be generated that requires the cardinality of the port be equal to the sum of the cardinality of the sub-types.

Another example of such an operator is a "bag" variable or multiset, which can contain various different elements, a multiple of the same elements, or a combination of both. An internal constraint can be generated that requires that the bag's count (i.e., the number of unique element selections) must be smaller than or equal to its cardinality (i.e., total number of element selections). Assume a bag operator has the following possible elements: paper cups, forks, knives, and spoons. A user selects two paper cups, one fork, and two spoons for the bag. The bag's count will be three and cardinality will be five. The internal constraint ensures the count is always less than or equal to the cardinality.

Although the sharing of common sub-expressions, as shown in FIG. 2, can reduce the size of the constraint network, it can complicate the understandability of the CSP network through the use of known methods such as conflict reporting or graph analysis. Internal constraints and transient constraints of dynamic substructure can further complicate the analysis and understandability of sub-graphs of the constraint network. One such example is in reporting consistency conflicts in a common sub-expression. For this reporting, it typically requires an understanding of the relations among the many constraint expressions defined.

In one embodiment, solver 16 collects all associated top constraint expressions when given a sub-expression by traversing the network of constraint expressions in the CSP. Therefore, for example, in the event of a conflict, solver 16 can provide meaningful information to the user and provide a better understanding of the CSP network, which can be useful for debugging activity. Another useful purpose for determining the top constraints of a shared sub-expression is for conflict-directed variable ordering heuristics, in which violated constraints need to be marked. When a violation occurred in a shared sub-expression, the top constraints should be found and marked.

Figure 4:
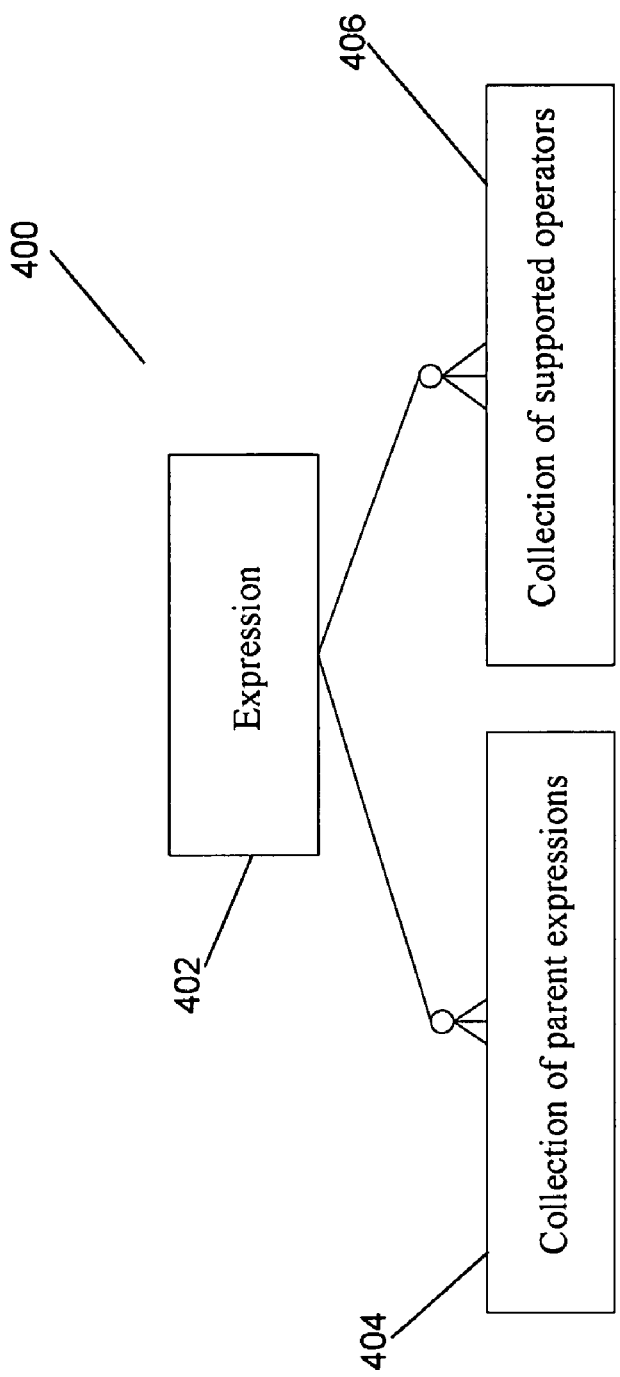
FIG. 4 is a block diagram of an example data structure that is generated and stored by a constraint solver to maintain expression relationships in accordance with one embodiment.

Solver 16 maintains data regarding the relationships between expressions, their sub-expressions, and/or any supporting internal constraints. FIG. 4 is a block diagram of an example data structure 400 that is generated and stored by solver 16 to maintain the relationships in accordance with one embodiment. Data structure 400 includes an expression 402, zero or more corresponding parent expressions 404, and zero or more corresponding supported operators 406 if the expression is also an internal constraint expression. Supported operators 406 may be a constraint, a sub-expression, a bag, a set, a port, etc. Using data structure 400, solver 16, in one embodiment, can traverse the constraint expression network and collect all the associated top constraint expressions when given a sub-expression.

Figure 5:
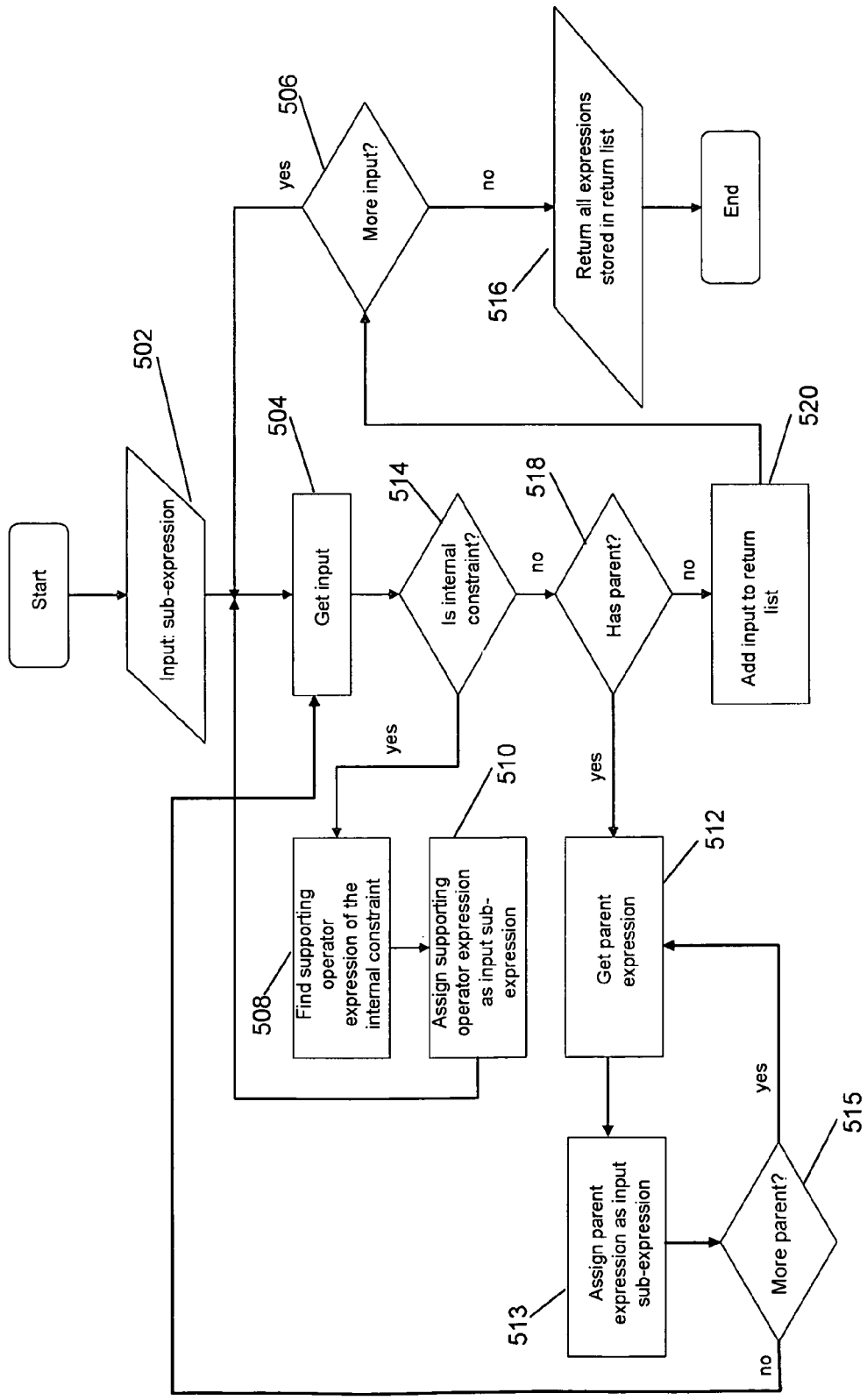
FIG. 5 is a flow diagram of the functionality of the constraint solver when traversing a constraint network from a sub-expression to all related top constraint expressions in accordance with one embodiment.

FIG. 5 is a flow diagram of the functionality of constraint solver module 16 when traversing a constraint network from a sub-expression to all related top constraint expressions in accordance with one embodiment. Solver 16 traverses up and examines all ancestors of the input sub-expression recursively until all the top constraint expressions are reached and collected. In one embodiment, the functionality of the flow diagram of FIG. 5, and FIG. 6 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 502 and 504, solver 16 receives a sub-expression.

At 514, it is determined if the sub-expression is an internal constraint.

If yes at 514, at 508 solver 16 finds the supporting operator expression of the internal constraint and assigns it as an input sub-expression at 510.

If no at 514, at 518 solver 16 checks if the input has any parent expressions. If no, then the input itself is a top constraint expression in the CSP and is recorded in the return list at 520 and functionality resumes at 506 where it is determined if there are more inputs.

If yes at 518, at 512 the parent expression is retrieved and at 513 the parent expression is assigned as the input sub-expression. At 515, it is determined if there are more parent expressions. If yes, functionality returns to 512. If no, functionality returns to 504. As a result of 512, 513 and 515, solver 16 examines all ancestors of the input sub-expression recursively until all the top constraint expressions are reached and collected and there are no more inputs at 506. At 516, all expressions are stored in a list, which is a list of all top constraint expressions. All of the top constraint expressions stored in the list of 516 should not have any parent expressions.

For the constraint network of FIG. 2, when given the sub-expression A+B as input, solver 16 when executing the functionality of FIG. 5 will return all its associated top constraint expressions: Constraint 1 and Constraint 2.

In one embodiment, solver 16 maps internal constraints to modeler-defined constraints. If a given sub-expression or any of its parent expressions is an internal constraint, solver 16 will look for the internal constraint's supporting operator expression instead and continue the constraint network traversal until reaching the top constraint expressions. Since the user did not explicitly defined these internal constraints, it is beneficial for solver 16 to further interpret these internal constraints in terms of modeler defined constraint expressions, and present this information to the user. Therefore, model-relevant context is provided to the user by solver 16 in one embodiment.

In one embodiment, solver 16 accounts for dynamic substructure in the constraint network by recognizing the presence of transient constraints in the network, and then chooses to pre-compute and record all top constraint expressions of a sub-expression before the dynamic structure becomes disconnected and discarded due to a conflict. When a conflict occurs while attempting to add a sub-problem due to a cross-problem constraint, the system rolls back the CSP to the last consistent state by discarding the sub-problem. However, the associated top constraint expressions should be identified since the given sub-expression resides in the discarded sub-problem. Therefore, if the conflict detected is triggered by a cross-problem constraint, solver 16 will pre-compute and record the top constraint expressions of the conflict triggering sub-expression before discarding the sub-problem in the event that the top constraint expressions are later needed.

Figure 6:
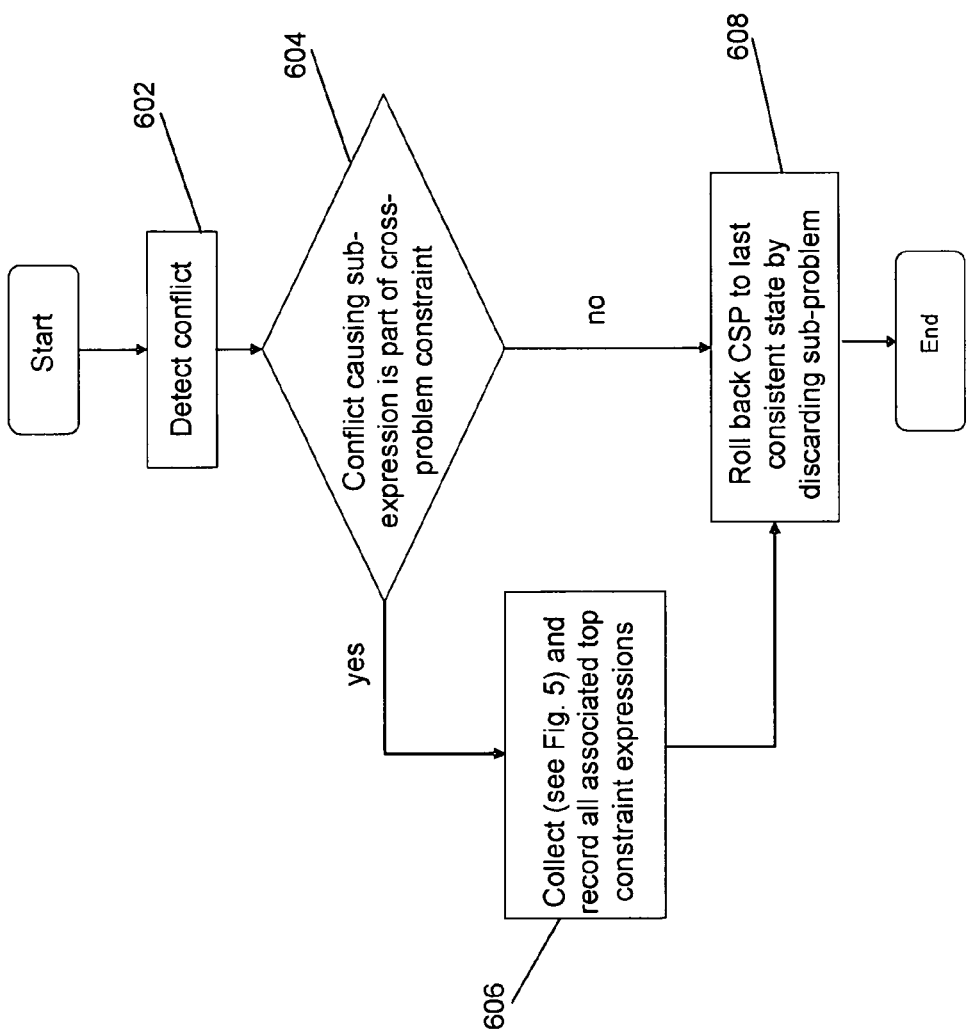
FIG. 6 is a flow diagram of the functionality of the constraint solver when pre-computing and recording the top constraint expressions if the conflict triggering sub-expression resides in a sub-problem that is about to be discarded.

FIG. 6 is a flow diagram of the functionality of constraint solver 16 when pre-computing and recording the top constraint expressions if the conflict triggering sub-expression resides in a sub-problem that is about to be discarded.

At 602, a conflict triggering a sub-expression is detected.

At 604, it is determined if the conflict is part of a cross-problem constraint.

If yes at 604, at 606 all associated top constraint expressions are collected and recorded using the functionality of FIG. 5.

If no at 604, at 608 the CSP is rolled back to the last consistent state by discarding the sub-problem.

One embodiment allows a user to specify a limit to the number of reported elements from traversing the network as in FIG. 5. Due to the potential large size of constraint network in a CSP, it is can be helpful to allow users to cap the number of reported top constraints.

As an example of above disclosed embodiments, consider the following CSP model definition:

Problem
|_Sub-Problem
| |_A [0.10]
|_B [0.10]
|_C [0.10]
|_D [0.10]
|_E {false, true}

Integer variables: A, B, C, D with domain from 0 to 10
Constraints Defined:

Sub-Problem.$A+B=C$  Constraint 1

Sub-Problem.$A+B<D$  Constraint 2

Constraint 3: E implies association of Sub-Problem to Problem.

1st User Decision: C=4
Solver 16 will reduce the domain of variable C to 4
2nd User Decision: Sub-Problem.A=1
Solver 16 will reduce the domain of variable A in Sub-Problem to 1. At this point, the Sub-Problem is not yet connected to the Problem so this user decision does not propagate to variable B (because of constraint 1).
3rd User Decision: B=2
Solver 16 will reduce the domain of the variable B to 2
4th User Decision: E=true
Solver 16 will associate the Sub-Problem to the Problem and the cross-problem Constraints 1 and 2 will be created with the association/generation of all its participating problems and sub-problems. Since C has a value of 4 due to the 1st user decision and C equals the + operator in Constraint 1, solver 16 can propagate the effect to the + operator and reduce its domain to 4.

Solver 16 will then detect the conflict while evaluating the sub-expression Sub-Problem.A+B, which is considered the cause of conflict. Since the + operator's domain was reduced to 4 as disclosed above, A and B cannot have the value 1 and 2 due to Constraint 1.

Finally, solver 16 will roll back the CSP to the last consistent state prior to the assertion of the 4th user decision, E=true. Since the cause of conflict resides in the sub-problem, which is about to be disconnected from the Problem, solver 16 will find and record all associated top constraint expressions of the sub-expression Sub-Problem.A+B before the disconnection.

Figure 7:
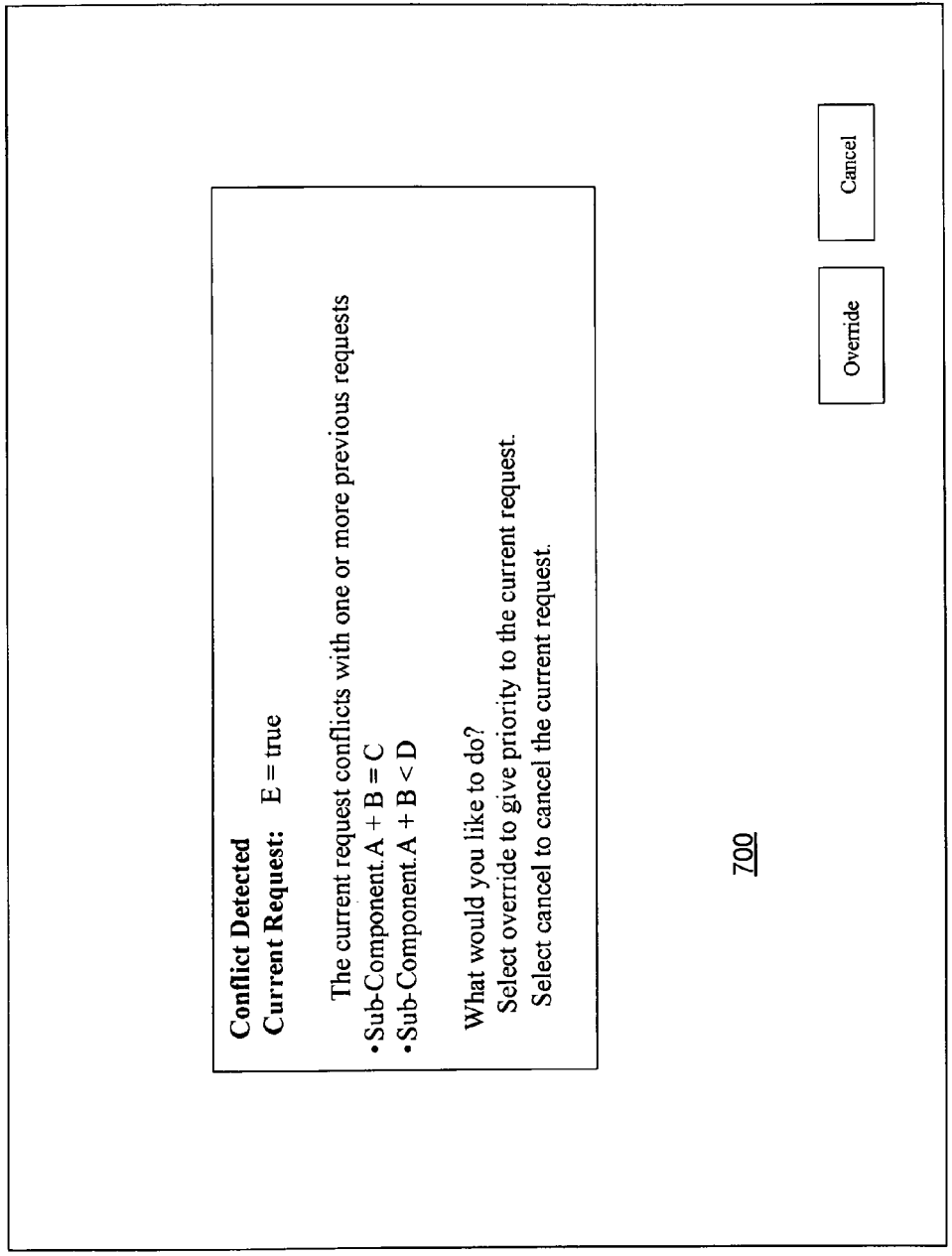
FIG. 7 illustrates an example user interface in accordance with one embodiment.

In one embodiment, solver 16 generates a user interface ("UI") to provide the cause of a conflict to the user. FIG. 7 illustrates an example UI 700 in accordance with one embodiment. UI 700 will be generated after attempting the 4th user decision in the above example. In UI 700, all associated top constraint expressions of the conflict cause is presented to provide a better understanding of the conflict to the user. UI 700 further allows the user to override to give priority to the current request, or cancel the current request.

As disclosed, a CSP solver determines all top constraint expressions when given a sub-expression in a CSP model. Further, the solver will roll back the CSP model to the last consistent state by discarding a sub-problem that was added due to a cross-problem constraint but record the top constraint expressions for later use, if needed. A UI can be generated that informs the user of a cause of a conflict based on the determination of the top constraint expressions.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer readable medium having instructions stored thereon that, when executed by a processor, causes the processor to solve a constraint satisfaction problem (CSP), the CSP comprising a network of variables and constraints, the instructions comprising:
   receiving a sub-expression;
   determining if the sub-expression is an internal constraint of the CSP, the internal constraint having a supporting operator expression; and
   determining one or more top constraint expressions associated with the supporting operator expression if the sub-expression is an internal constraint.

2. The computer readable medium of claim 1, further comprising:
   presenting the top constraint expressions to a user in response to a conflict in the CSP.

3. The computer readable medium of claim 2, wherein the presenting comprises a user interface that allows the user to override a user decision.

4. The computer readable medium of claim 1, wherein the determining one or more top constraint expressions comprises:
   (a) assigning the sub-expression as an input sub-expression;
   (b) finding a first supporting operator expression of the input sub-expression;
   (c) determining if the first supporting operator expression has any parent expressions;
   (d) if the first supporting operator expression does not have any parent expressions, then designating the first supporting operator expression as one of the one or more top constraint expressions; and
   (e) if the first supporting operator expression has a parent expression, assigning the first supporting operator expression as the input sub-expression and repeating (a)-(e).

5. The computer readable medium of claim 1, further comprising generating a data structure comprising a first expression and corresponding zero or more parent expressions.

6. The computer readable medium of claim 5, the data structure further comprising corresponding zero or more supported operators.

7. The computer readable medium of claim 1, wherein the conflict is caused by a user decision.

8. The computer readable medium of claim 7, wherein the sub-expression is a cross-problem constraint sub-expression, further comprising:
rolling back the CSP by discarding the cross-problem constraint sub-expression.

9. The computer readable medium of claim 1, wherein the internal constraint is generated by at least one of the group comprising: a port operator, a set, a bag variable and a second constraint.

10. A constraint satisfaction problem (CSP) solver comprising:
a processor;
a memory coupled to the processor, the memory storing instructions that when executed by the processor,
receives a sub-expression;
determines if the sub-expression is an internal constraint of the CSP, the internal constraint having a supporting operator expression;
determines one or more top constraint expressions associated with the supporting operator expression if the sub-expression is an internal constraint; and
stores as a data structure the sub-expression, the top constraint expressions and corresponding supporting operator expressions.

11. The CSP solver of claim 10, wherein the determines one or more top constraint expressions comprises:
(a) assigning the sub-expression as an input sub-expression;
(b) finding a supporting operator expression of the input sub-expression;
(c) determining if the supporting operator expression has any parent expressions;
(d) if the supporting operator expression does not have any parent expressions, then designating the supporting operator expression as one of the one or more top constraint expressions; and
(e) if the supporting operator expression has a parent expression, assigning the supporting operator expression as the input sub-expression and repeating (a)-(e).

12. A computer implemented method of solving a constraint satisfaction problem (CSP), the method comprising:
receiving a sub-expression;
determining if the sub-expression is an internal constraint of the CSP, the internal constraint having a supporting operator expression; and
determining one or more top constraint expressions associated with the supporting operator expression if the sub-expression is an internal constraint.

13. The method of claim 12, further comprising:
generating a user interface for presenting the top constraint expressions to a user in response to a conflict in the CSP and providing an option for the user to resolve the conflict.

* * * * *

UNITED STATES PATENT AND TRADEMARK OFFICE
CERTIFICATE OF CORRECTION

PATENT NO. : 8,170,970 B2  
APPLICATION NO. : 12/490725  
DATED : May 1, 2012  
INVENTOR(S) : Bagley et al.

Page 1 of 1

It is certified that error appears in the above-identified patent and that said Letters Patent is hereby corrected as shown below:

On page 2, in column 2, under "Other Publications", line 12, delete "IJCAL; 2003." and insert -- IJCAI; 2003. --, therefor.

In column 4, line 25, after "with" insert --"="--.

In column 10, line 1, in Claim 11, delete "determines" and insert -- determining --, therefor.

Signed and Sealed this  
Thirty-first Day of July, 2012

David J. Kappos  
*Director of the United States Patent and Trademark Office*